United States Patent
Chiu

(10) Patent No.: US 10,817,642 B1
(45) Date of Patent: Oct. 27, 2020

(54) SYSTEMS AND METHODS FOR RESERVING IC DESIGN SPACING FOR POWER NET ROUTING

(71) Applicant: Synopsys, Inc., Mountain View, CA (US)

(72) Inventor: Hsien-Shih Chiu, Taipei (TW)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 16/352,386

(22) Filed: Mar. 13, 2019

Related U.S. Application Data

(60) Provisional application No. 62/642,384, filed on Mar. 13, 2018.

(51) Int. Cl.
*G06F 30/33* (2020.01)
*G06F 30/394* (2020.01)
*G06F 30/398* (2020.01)

(52) U.S. Cl.
CPC .......... *G06F 30/394* (2020.01); *G06F 30/398* (2020.01)

(58) Field of Classification Search
CPC ........... H01L 27/0694; H01L 27/11529; H01L 27/11521; H03K 17/687; H03K 19/0948; H03K 19/17704; H03K 19/17736; G11C 8/16; G03F 9/7076; G03F 9/7084; G06F 30/394; G06F 30/392; G06F 13/1694; G06F 2113/18
USPC .................................................. 716/126–131
See application file for complete search history.

(56) References Cited

U.S. PATENT DOCUMENTS

| | | | | |
|---|---|---|---|---|
| 8,006,216 B1* | 8/2011 | Chen | ..................... | G06F 30/394 716/126 |
| 8,601,429 B1* | 12/2013 | Yao | ......................... | G06F 30/39 716/137 |
| 9,881,118 B2 | 1/2018 | Chiu et al. | | |
| 2014/0289693 A1 | 9/2014 | Koduri et al. | | |
| 2015/0278421 A1* | 10/2015 | Chiu | ..................... | G06F 30/394 257/737 |

OTHER PUBLICATIONS

Wang et al., "Octilinear Redistributive Routing in Bump Arrays," University of California, San Diego, doi:10.1145/1531542.1531591, (Jan. 1, 2009).

* cited by examiner

*Primary Examiner* — Binh C Tat
(74) *Attorney, Agent, or Firm* — Alston & Bird LLP

(57) ABSTRACT

Various embodiments are directed to a mechanism for reserving power resources to address non-uniform and complex routings on a redistribution layer of a flip-chip. Reserving power resources may be performed by rerouting RDL nets by, for example, identifying an initial RDL net route for a RDL net; defining an outer boundary relative to the initial RDL net route, wherein a perimeter of the outer boundary is defined at a defined distance away from the initial RDL net route; defining one or more blockages extending from bumps to intersect the outer boundary; subdividing the initial RDL net route into a plurality of net portions, wherein each net portion is bounded by a portion of the outer boundary and one or more of the blockages; and rerouting at least one of the plurality of net portions to be adjacent at least one blockage bounding the circuit net portion.

18 Claims, 14 Drawing Sheets

SYSTEMS AND METHODS FOR RESERVING IC DESIGN SPACING FOR POWER NET ROUTING

CROSS-REFERENCE TO RELATED APPLICATIONS

This patent application claims priority from U.S. Provisional Appl. Ser. No. 62/642,384, filed Mar. 13, 2018, which is incorporated herein by reference in its entirety.

BACKGROUND—DISCLAIMER

In the following Background, Summary, and Detailed Description, headings should not be construed as necessarily limiting. In the following Background, Summary and Detailed Description, citation or identification of any publication does not signify relevance or status as prior art for any of the claimed or described embodiments. Paragraphs for which the text is all italicized signifies text that is common to multiple Synopsys patent specifications.

BACKGROUND

Advances in integrated circuit (IC) design and manufacturing are essential to the development of electronic devices that operate at faster speed and consume less power. Adding more functionality and interfaces to an IC while reducing the size of the IC remains a challenge. The increasing number of interfaces and functionality in designs today demands ever more pads for power supply and inputs/outputs, which undesirably results in larger die sizes (e.g., pad-limited design). To handle the large number of input and output signals, more and more designers are using the flip-chip design.

To improve I-R (current-resistance) drop characteristics on the design boundary of IC chips and to provide uniform power in the chips, designers add power/ground nets from the core of the design to be routed through the remaining channels between the spaces around the existing RDL (ReDistribution Layer) route. However, in normal RDL design, the remaining channels still may not be enough. Reserving power resources encompasses increasing the remaining channels. Reserving power resources dramatically improves the routing efficiency and provides enough space (more channel space) for the power/ground nets to route through from the core area above to the I/O (Input/Output) region below.

Existing configurations, such as those described in U.S. Pat. No. 9,881,118, which is incorporated herein by reference in its entirety, focus on peripheral designs with simple and regular routing. However, such proposals do not address the large number of complex routing styles in use. The previous method will not reserve sufficient space for complex designs.

BRIEF SUMMARY

The claims signify a brief description of one or more of the innovations, embodiments, and/or examples found within this disclosure.

Various embodiments address problems with reserving sufficient power resource area for non-uniform and complex routing through automated design and routing. The optimized routing direction may be different for various detour routing, and the optimized area and/or order may impact the result of detour routing.

Certain embodiments are directed to computer-implemented methods for routing a circuit net within a flip-chip circuit device having an array of bumps. In various embodiments, the computer-implemented method comprises identifying an initial circuit net route for a circuit net associated with a bump included in the flip-chip circuit device; defining an outer boundary relative to the initial circuit net route, wherein a perimeter of the outer boundary is defined at a defined distance away from the initial circuit net route; defining one or more blockages extending from each of the array of bumps to intersect the outer boundary; subdividing the initial circuit net route into a plurality of circuit net portions, wherein each circuit net portion is bounded by a portion of the outer boundary and one or more of the blockages; and rerouting at least one of the plurality of circuit net portions to be adjacent to at least one blockage bounding the circuit net portion.

In certain embodiments, the circuit net is defined as a Redistribution Layer (RDL) net. Moreover, the RDL net may comprise a plurality of wires. In certain embodiments, defining an outer boundary comprises defining an outer boundary surrounding each of the plurality of wires. In certain embodiments, defining one or more blockages comprises: defining four blockages extending from each bump; and removing blockages that intersect the initial circuit net route. In various embodiments, rerouting at least one of the plurality of circuit net portions comprises routing at least one of the plurality of circuit net portions around at least a portion of each of one or more bumps.

Various embodiments are directed to a non-transitory computer readable medium comprising instructions which when executed by a computer cause the computer to: identify an initial circuit net route for a circuit net associated with a bump included in the flip-chip circuit device; define an outer boundary relative to the initial circuit net route, wherein a perimeter of the outer boundary is defined at a defined distance away from the initial circuit net route; define one or more blockages extending from each of the array of bumps to intersect the outer boundary; subdivide the initial circuit net route into a plurality of circuit net portions, wherein each circuit net portion is bounded by a portion of the outer boundary and one or more of the blockages; and reroute at least one of the plurality of circuit net portions to be adjacent to at least one blockage bounding the circuit net portion.

In certain embodiments, the circuit net is defined as a Redistribution Layer (RDL) net. Moreover, the RDL net may comprise a plurality of wires. In various embodiments, defining an outer boundary comprises defining an outer boundary surrounding each of the plurality of wires. Moreover, defining one or more blockages may comprise: defining four blockages extending from each bump; and removing blockages that intersect the initial circuit net route. In various embodiments, rerouting at least one of the plurality of circuit net portions comprises routing at least one of the plurality of circuit net portions around at least a portion of each of one or more bumps.

Certain embodiments are directed to a system for routing a circuit net within a flip-chip circuit device having an array of bumps. In certain embodiments, the system comprises: at least one processing unit configured to: identify an initial circuit net route for a circuit net associated with a bump included in the flip-chip circuit device; define an outer boundary relative to the initial circuit net route, wherein a perimeter of the outer boundary is defined at a defined distance away from the initial circuit net route; define one or more blockages extending from each of the array of bumps to intersect the outer boundary; subdivide the initial circuit net route into a plurality of circuit net portions, wherein each circuit net portion is bounded by a portion of the outer boundary and one or more of the blockages; and reroute at least one of the plurality of circuit net portions to be adjacent to at least one blockage bounding the circuit net portion.

In various embodiments, the circuit net is defined as a Redistribution Layer (RDL) net. Moreover, the RDL net may comprise a plurality of wires. In certain embodiments, defining an outer boundary comprises defining an outer boundary surrounding each of the plurality of wires. In various embodiments, defining one or more blockages comprises: defining four blockages extending from each bump; and removing blockages that intersect the initial circuit net route. Moreover, rerouting the at least one of the plurality of circuit net portions may comprise routing the at least one of the plurality of circuit net portions around at least a portion of each of one or more bumps.

This Summary does not attempt to provide the complete significance of any particular innovation, embodiment, or example as it can be used in commerce. Additionally, this Summary is not intended to signify key or critical elements of an innovation, embodiment or example or to limit the scope of the subject matter of this disclosure.

The innovations, embodiments, and/or examples found within this disclosure are not all-inclusive, but rather describe the basic significance of the subject matter. Accordingly, one use of this Summary is as a prelude to a Detailed Description presented later.

The innovations, embodiments, and/or examples found within this disclosure are not all-inclusive, but rather describe the basic significance of the subject matter. Accordingly, one use of this Summary is as a prelude to a Detailed Description presented later.

BRIEF DESCRIPTION OF THE SEVERAL VIEWS OF THE DRAWINGS

The following Detailed Description, Figures and appended claims signify the nature and advantages of the innovations, embodiments and/or examples of the claimed inventions. All of the Figures signify innovations, embodiments, and/or examples of the claimed inventions for purposes of illustration only and do not limit the scope of the claimed inventions. Such Figures are not necessarily drawn to scale, and are part of the Disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

DETAILED DESCRIPTION

The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to provide a thorough understanding of one or more of the exemplary innovations, embodiments and/or examples. In the interest of not obscuring the presentation of the exemplary innovations, embodiments and/or examples in the following Detailed Description, some processing steps or operations that are known in the art may have been combined together for presentation and for illustration purposes and might not be described in detail. However, a person skilled in the art will recognize that these exemplary innovations, embodiments and/or examples may be used in commerce without these specific details or with equivalents thereof. In other instances, well-known processes and devices are not described in detail as not to unnecessarily obscure aspects of these exemplary innovations, embodiments and/or examples. In other instances, some processing steps or operations that are known in the art may not be described at all. The following description is instead focused on the distinctive features or elements of various exemplary innovations, embodiments and/or examples. Furthermore, while this description may refer to some components of the structure in the singular tense, more than one component may be depicted throughout the Figures and like components are labeled with like numerals.

Figure 1:
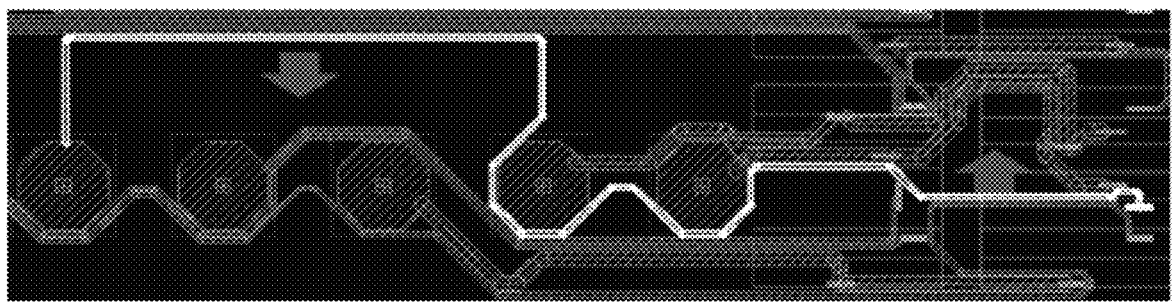
FIGS. 1-4 depicts various inefficient net routing on an IC chip.
Figure 2:
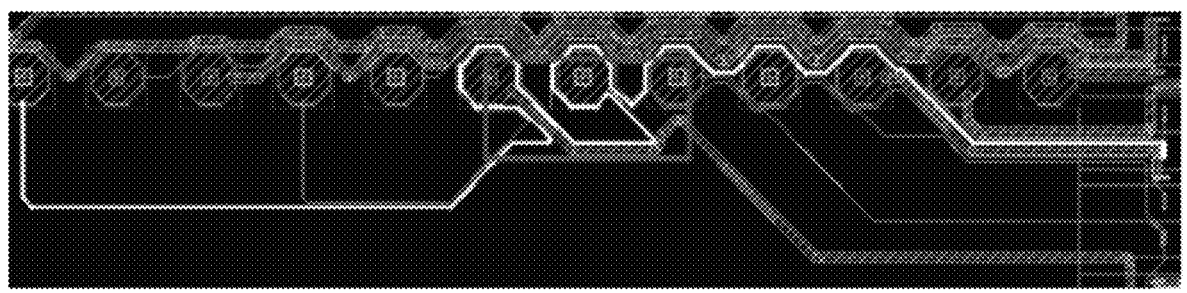
Figure 3:
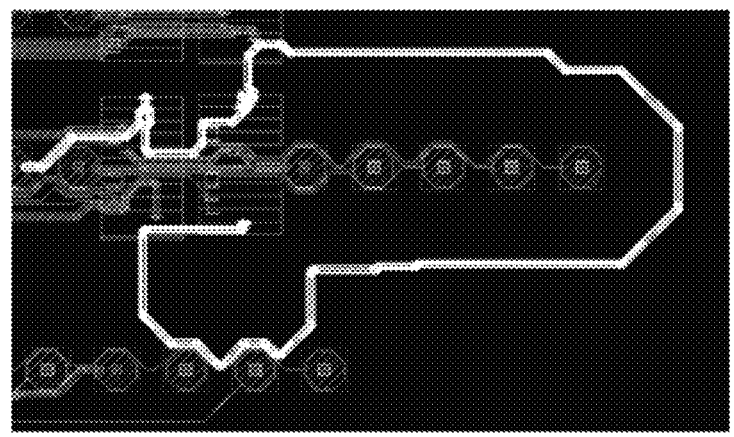
Figure 4:
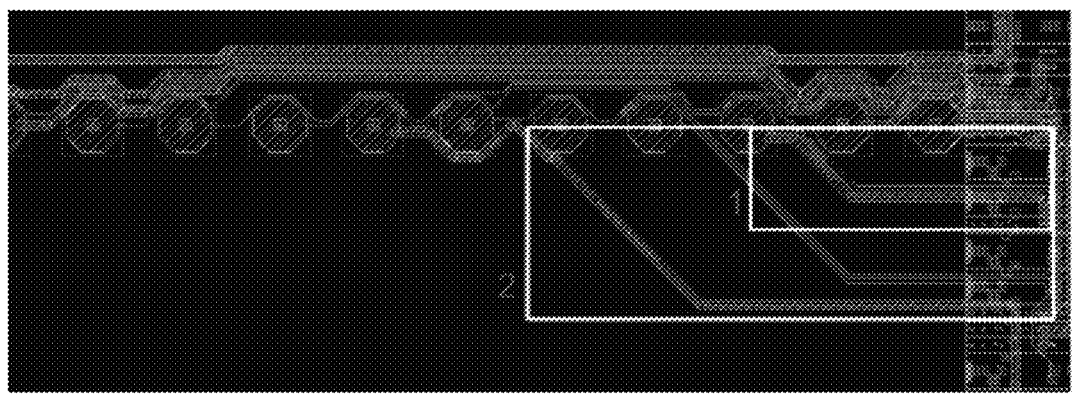
Figure 5:
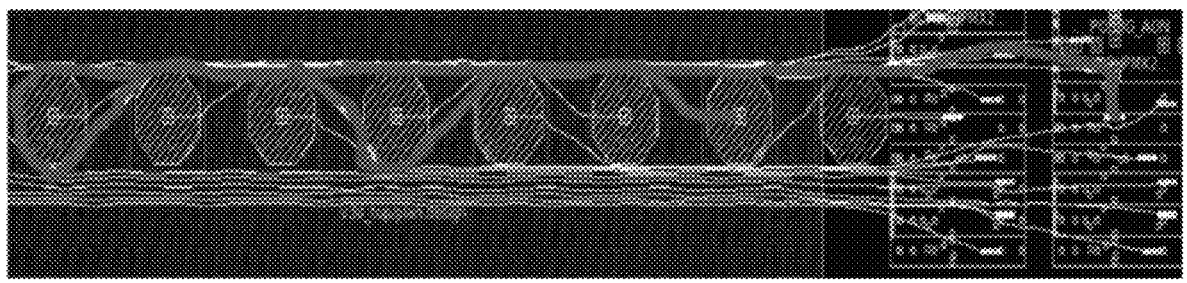
FIG. 5 illustrates an example complex routing that may be achieved automatically in accordance with certain embodiments.

Various embodiments efficiently generate routing for circuit designs. The various embodiments thereby avoid inefficient or problematic routing, such as those illustrated in FIGS. 1-4. Various embodiments select appropriate routing automatically, and automatically generate highly complex power routings, such as the example shown in FIG. 5. Such embodiments optimize the original net by adding specific blockages to partition the net. Then, according to the crossing and position, such embodiments analyze the optimal direction and area for positioning the power wires.

Definitions

In an exemplary embodiment, an integrated circuit flip-chip includes I/O (Input/Output) pads, bumps, and RDL (Redistribution Layer) metal layer. The RDL layer includes nets (interconnect wires) that connects the pads and the bumps. The bumps may include core power and ground bumps and I/O bumps. The core power and ground bumps may be located in the center of the chip and the I/O bumps may be located around the periphery of the chip. The circuitry located below the bumps may receive less power due to an I-R voltage drop.

As discussed herein, the term "flip chip" signifies a chip implementation, where the chip pads (bumps) are disposed on the top of the chip (IC, die). In general, a flip chip is used in designs with a large die that is limited by the number of pads on the chip boundary. The chip is generally flipped over so that the surface of the active area of the flip chip can be used for interconnection through metal bumps of solder. These bumps are soldered onto a circuit board or a package substrate (e.g., a ball grid array). This is in contrast to a wire-bond IC (die) that is fabricated with metal bonding pads along the periphery, where the metal pads serve as terminals for connecting to external signals.

RDL is an abbreviation of Redistribution layer and signifies the top most layer that connects the bumps in a flip-chip design. A redistribution layer is a metal layer on a chip that allows the I/O pads of an IC available in other locations.

The term "bump" signifies a cell used at the top-layer of a flip-chip design representing access points to provide connections between exterior and internal circuitry of the chip. Bumps may be provided in an array (e.g., comprising one or more rows and/or one or more columns). Bumps are solder spheres attached to the bump pads. A RDL may be used to reroute the chip pads to the bump pads. In this application, the bumps may be used interchangeably as bump cells, bump pads or flip-chip bumps and may denote core bumps or I/O (Inputs/Outputs) bumps.

The term "flip chip pads" as discussed herein signifies I/O pad cells or the IP functional blocks at the boundary of the chip that connects to the bumps at the top-most layer to the internal circuit of the chip in the lower layers. I/O pads are referred to as flip chip pads or pads, in the alternative.

The term "RDL nets" signifies wires connected between a bump and a flip chip pad. The wire can be an octagon or a rectangle, as non-limiting examples.

The term "bump pitch" signifies the bump-to-bump distance between two adjacent bumps disposed in the same row or in the same column of a bump array.

In normal RDL design, the area near the design boundary is occupied by RDL nets. The term "power resource reservation" signifies methods for pushing these RDL nets close to the design boundary to reserve some area for power nets routing in the area.

Discussion of Various Embodiments

Embodiments of the present invention provide routing methods and devices for a flip -chip package. According to an embodiment, an IC design specification is prepared, a functional description corresponding to the IC specification is generated, a gate-level circuit description is synthesized from the functional description, a simulation is performed to verify the gate-level circuit against the functional description, and a layout is performed based on a database of the flip-chip package.

In an exemplary embodiment, an EDA tool routes RDL nets around bump pads to conserve resources (e.g., IC surface area) for routing power nets thereon. The EDA tool performs these routing methodologies as discussed herein based at least in part on a defined preliminary routing (e.g., as determined during the initial design phase).

Figure 6:
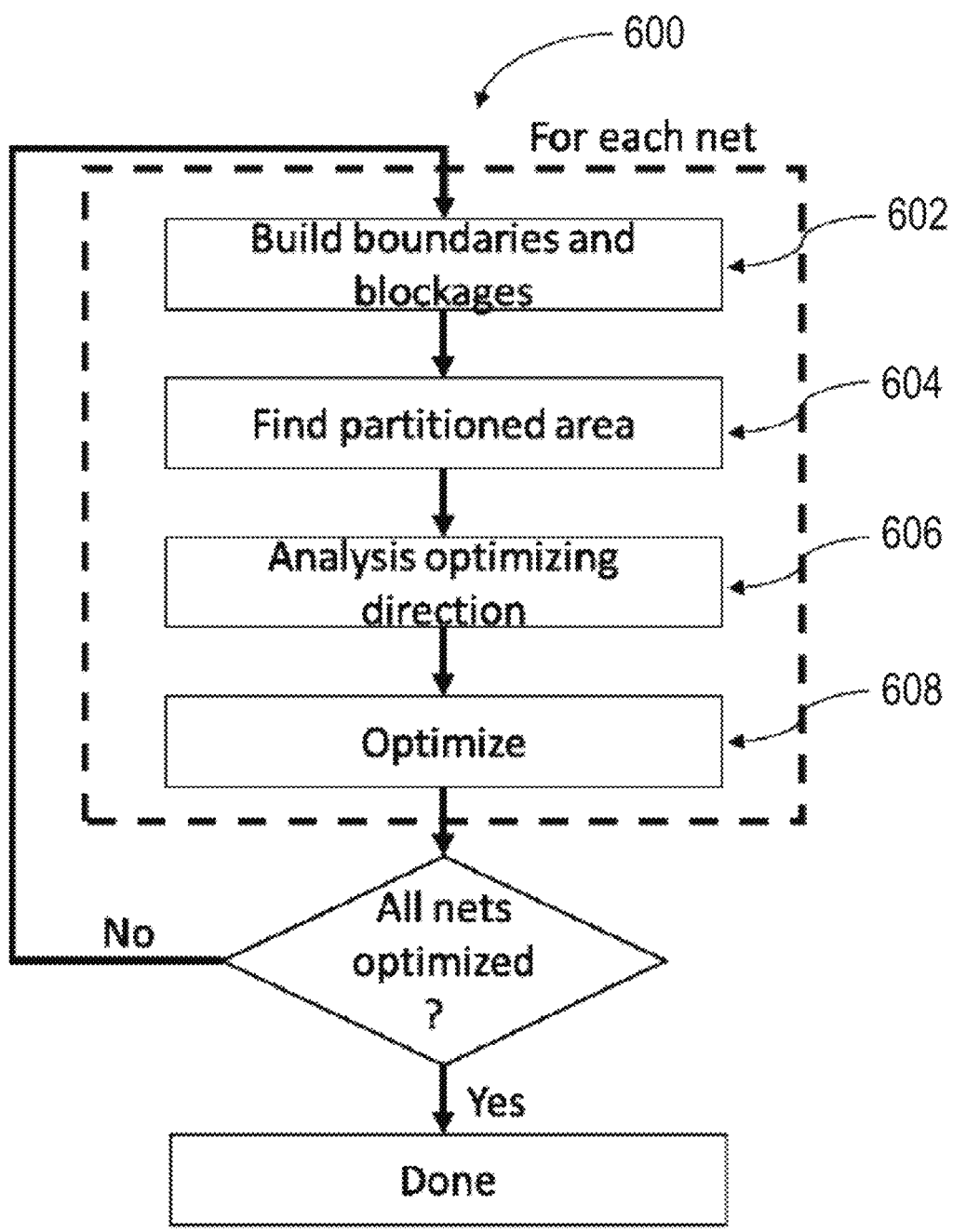
FIG. 6 is a simplified flow chart of a method of reserving power resource for an integrated circuit according to an embodiment of the present invention.
Figure 7:
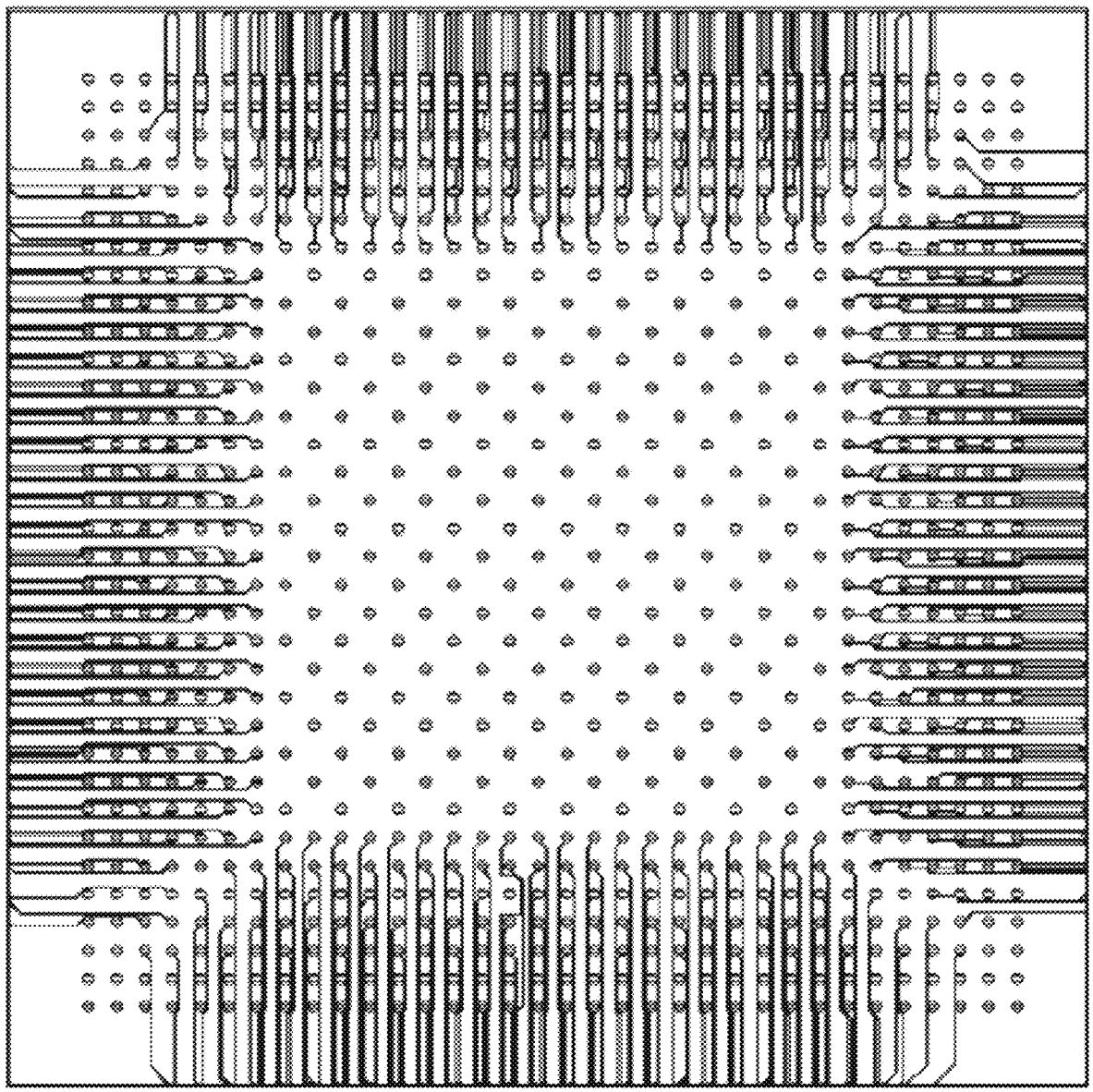
FIG. 7 is an example of an RDL design.

FIG. 6 is a simplified flow chart of a method 600 according to an embodiment of the present invention. The various steps/processes executed as a part of the methodology illustrated in FIG. 6 are performed with respect to an existing RDL design with corresponding initial RDL net routes (e.g., see FIG. 7). Accordingly, the flow of FIG. 6 operates with respect to an existing RDL design with initial RDL net routes. Moreover, the various processes represented within FIG. 6 (and discussed herein) may be performed automatically, for example by a circuit design program executable via a computer system. In certain embodiments, the various processes represented within FIG. 6 and discussed herein may be performed as a part of an IC design process (e.g., automatically) after establishing preliminary wire routing pathways for an RDL net.

Figure 8:
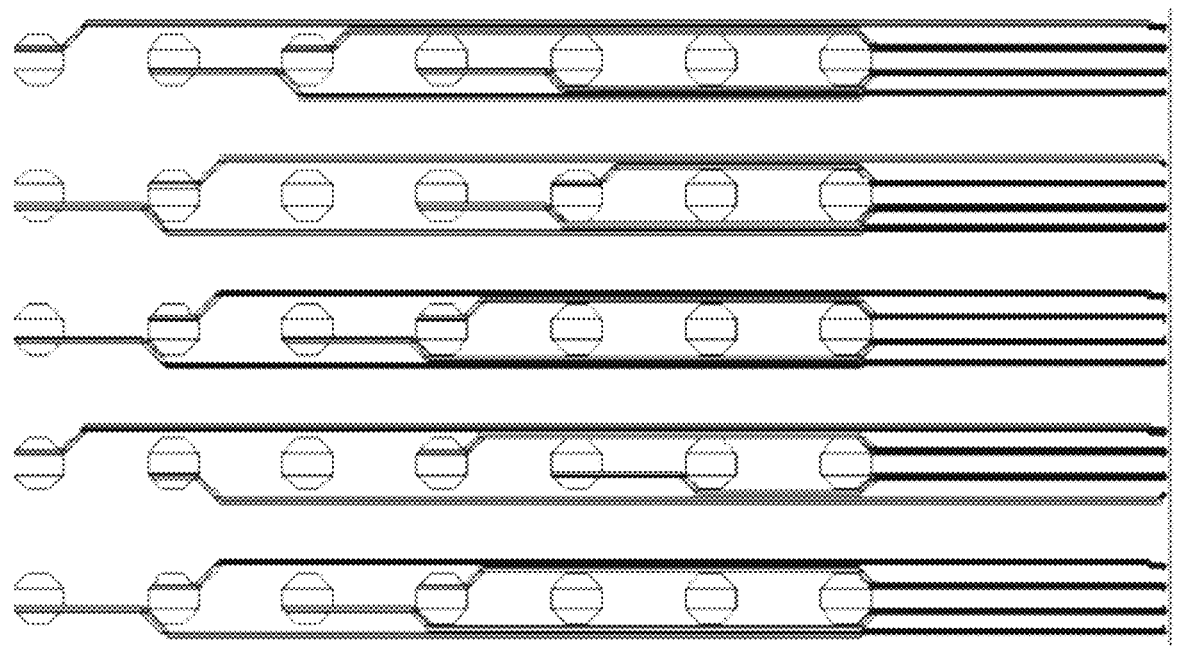
FIG. 8 is a screenshot of an RDL net. It is a partial RDL design of FIG. 7.
Figure 9:
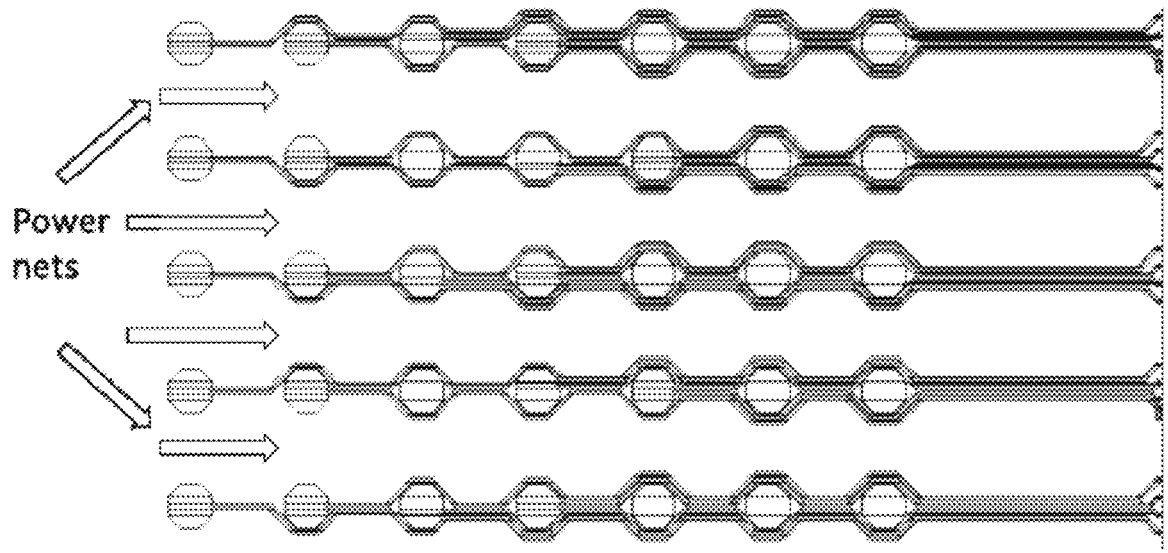
FIG. 9 is an example reserving power resource according to an embodiment of the present invention.

Various embodiments optimize these RDL nets to reserve resources (e.g., surface area of an IC chip) for power net routing. FIG. 8 is close-up view of a portion of the RDL design of FIG. 7. These are original RDL nets before optimizing by the invention. FIG. 9 is a view of the same RDL nets after optimization. The optimization process thereby reserves additional space for the placement of power nets relative to the RDL design. Method 600 includes a step 602 that builds boundaries and blockages, a step 604 for finding partitioned area, a step 606 for analysis to optimize direction, and a step 608 for optimizing RDL nets. As shown in FIG. 6, the process is repeated if necessary, until all nets are optimized in accordance with the recited steps, each of which are discussed in greater detail herein.

Figure 10:
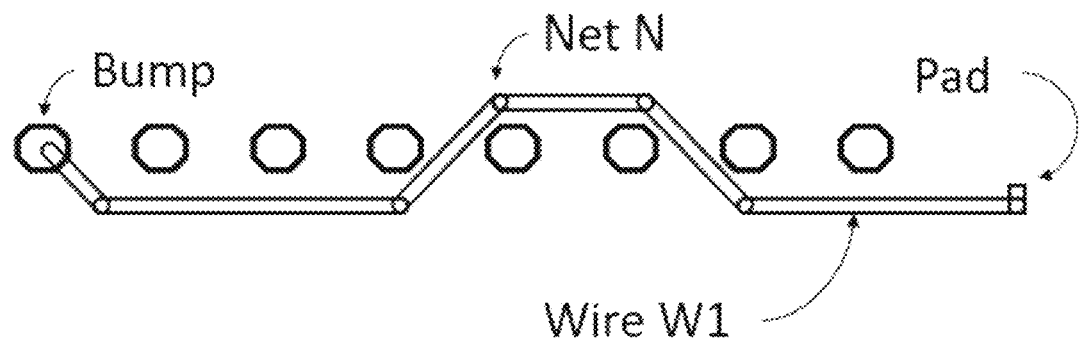
FIG. 10 is an example of RDL net N which connects a bump and a pad by several wires.

FIG. 10 is an example of RDL net (Net N). As shown therein, an RDL net is constructed by several wires (each illustrated as an elongated outlined portion). Moreover, as shown in FIG. 10, the ends of each of the illustrated generally linear wires overlaps one another to provide a continuous electrical pathway between the pad and the relevant bump. In the example, collectively, the various wire components form an overall RDL net, including 6 wire segments.

Figure 11:
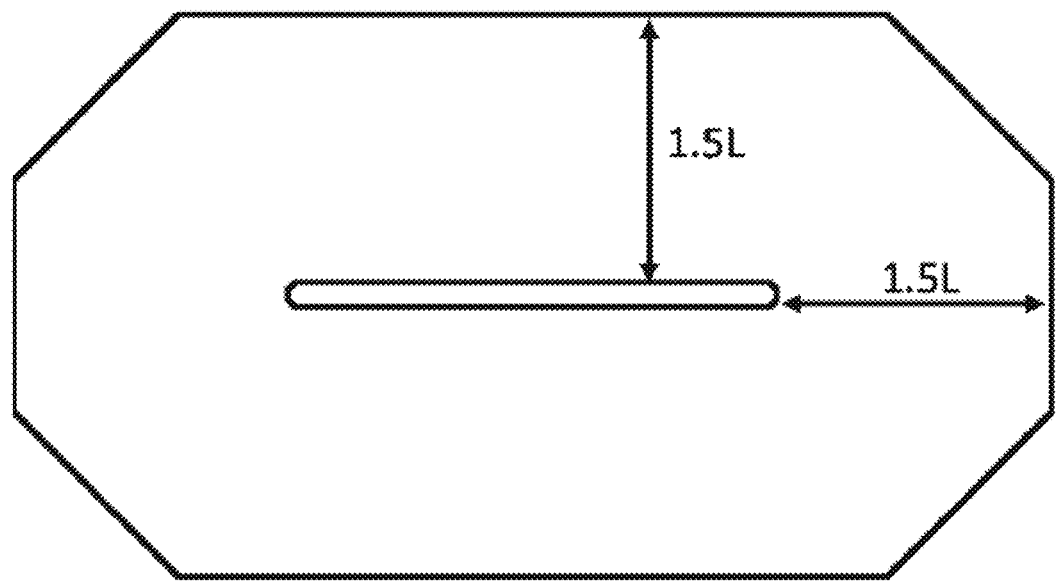
FIG. 11 is an example of widening a wire.
Figure 12:
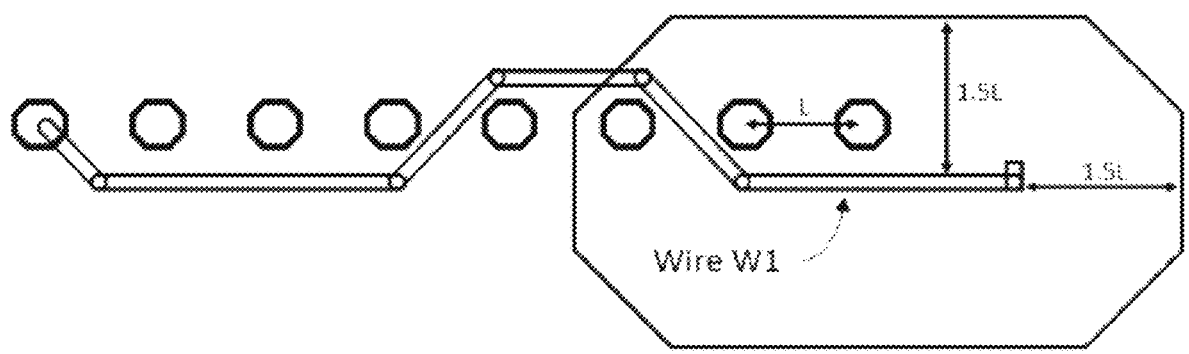
FIG. 12 is an example of widening a wire W1.
Figure 13:
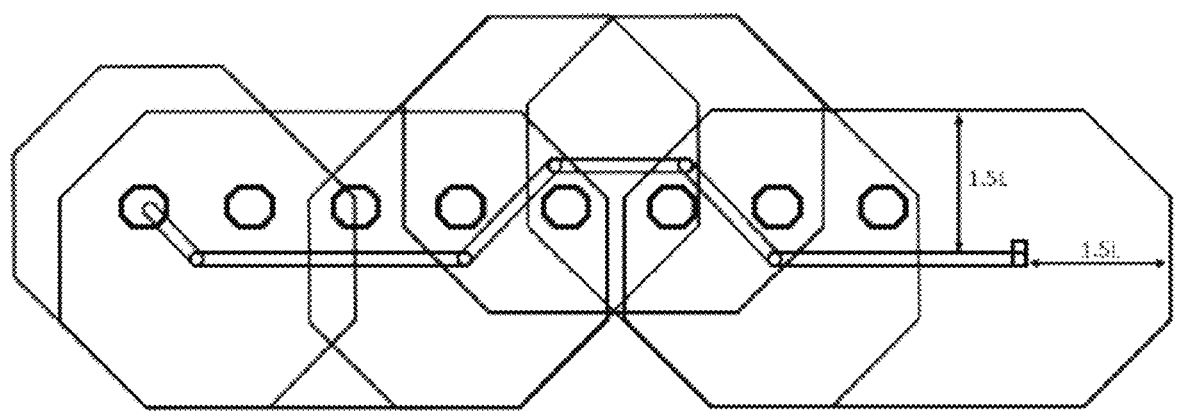
FIG. 13 is an example of widening each wire in net N.

With reference to the step represented at Block 602 of the flowchart of FIG. 6 as applied to the example RDL net of FIG. 10, an overall outside boundary is formed around the RDL net (e.g., around each wire segment within the RDL net), as shown in FIG. 13. The outside boundary shown in FIG. 13 is generally formed by providing a boundary around each wire segment shown in FIG. 10. For each wire segment, the boundary is determined as an area having a predefined size relative to each wire segment. As shown in FIG. 11, for example, the area is determined by widening the wire both perpendicular to the length of the wire and parallel to the length of the wire, by a predefined distance (and represented relative to the overall wire path in FIG. 12). As a non-limiting example as shown, the predefined distance is equal to about 1.5 times the bump pitch (L), however other distances are also usable. The outside boundary of this widened area is defined as the outside boundary of the wire.

Figure 14:
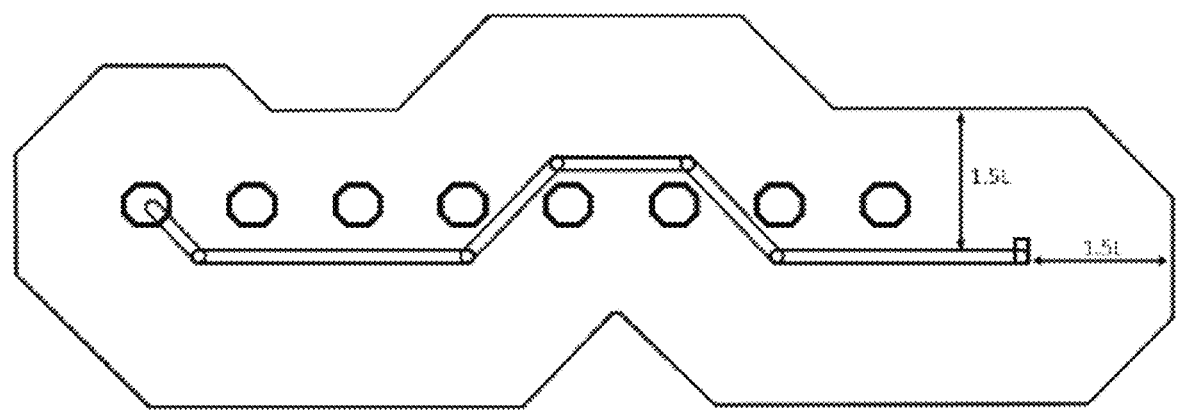
FIG. 14 illustrates an example outside boundary which is the contour of widening wires.

In this embodiment, each specific wire of the RDL net is widened about 1.5 times bump pitch (L) to form the outside boundary surrounding the overall conductive wire path, as shown in FIG. 13. The perimeter of the outermost edge of the widened wires is the outside boundary (see FIG. 14).

Figure 15:
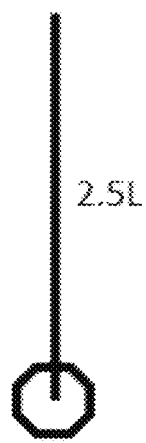
FIG. 15 is an example of creating a blockage in an upward direction for a bump.
Figure 16:
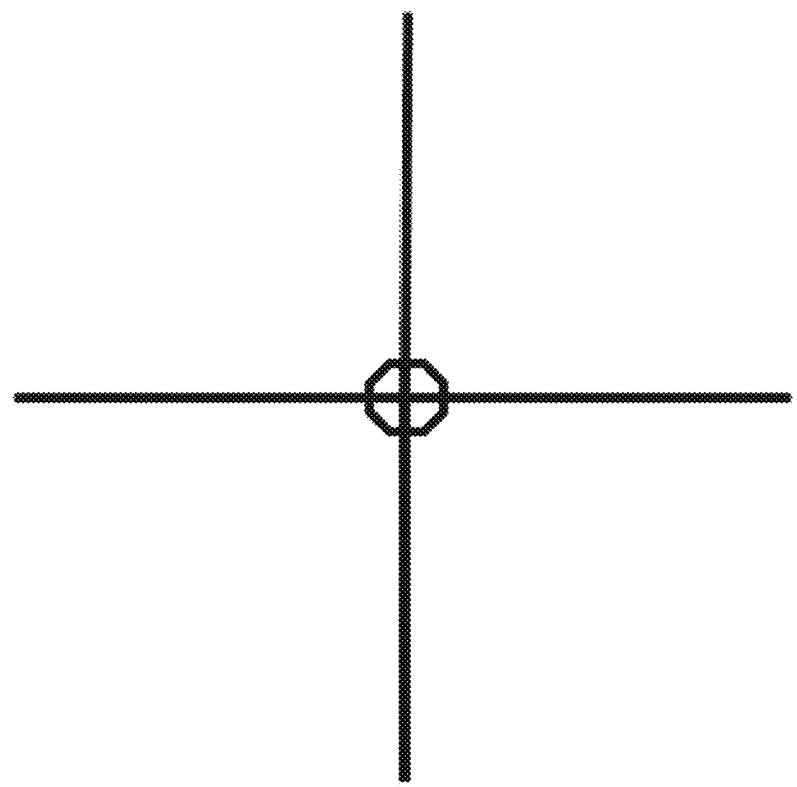
FIG. 16 is an example of creating blockages in 4 directions for a bump.
Figure 17:
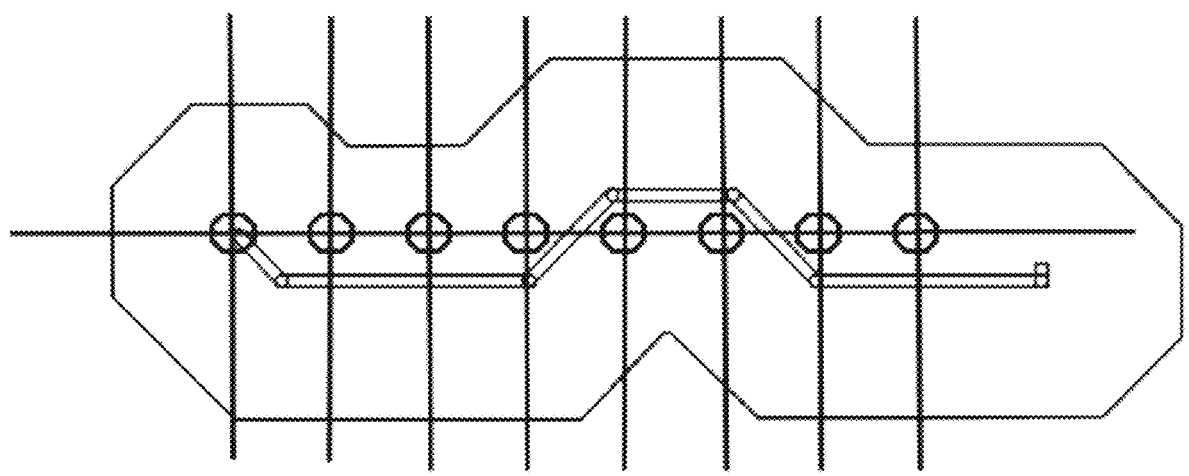
FIG. 17 illustrates an example of creating blockages for each bump inside the outside boundary.
Figure 18:
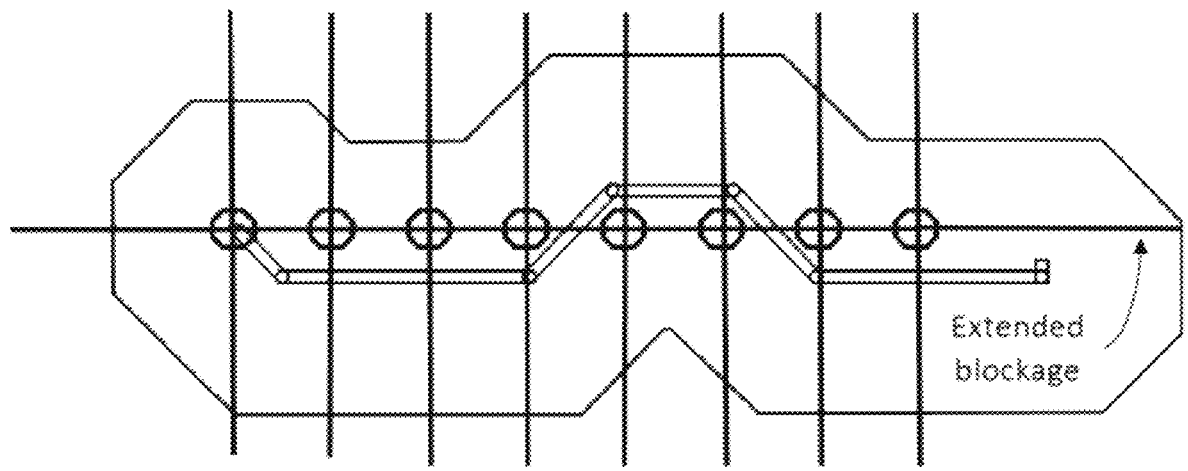
FIG. 18 illustrates an example for extending the blockage (see the right-most blockage) to touch the outside boundary.

After creating the outside boundary, internal blockages are created. For each bump located within the defined outside boundary, blockages are created by extending a line from the center of each bump (as shown in FIG. 15) in each of 4 directions (perpendicular to sides of each bump, and each line is perpendicular to others of the generated blockage lines). As shown in FIG. 15, each blockage line may have a defined length (prior to trimming, as discussed herein), and the defined length may be longer than the widening distance of each wire utilized for forming the outer boundary. As just one non-limiting example, each blockage line may have a defined length prior to trimming equal to about 2.5 times the bump pitch (L), as shown in FIG. 15. These four directions are illustrated as up, down, right and left in the embodiment shown in FIG. 16. FIG. 17 illustrates an example of formed blockages within the RDL design discussed previously. In certain embodiments, the blockage lines may extend to the outside boundary to define enclosed areas bounded by one or more blockage lines and one or more outside boundaries. The blockage lines may not cross the outside boundary or another bump, such that the blockage lines may be utilized both for selecting individual areas containing portions of the RDL net (discussed herein) and for providing guidance for moving the RDL net (e.g., against the blockage lines). Accordingly, where the initial defined length of the blockage lines extend beyond the defined outside boundary, or where the blockage lines intersect an adjacent bump, those blockage lines may be trimmed (e.g., to meet the outer boundary or to meet an edge of a bump) for further processing. Moreover, in the illustrated embodiment of FIG. 18, each blockage is extended until it touches the outside boundary or another bump (e.g., the right-most horizontal blockage line illustrated in FIG. 18 is extended to the outside boundary).

Figure 19:
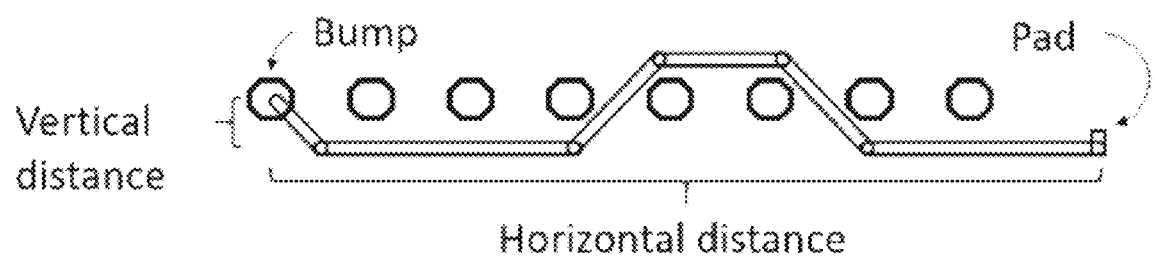
FIG. 19 is an example of the vertical and horizontal distances.
Figure 20:
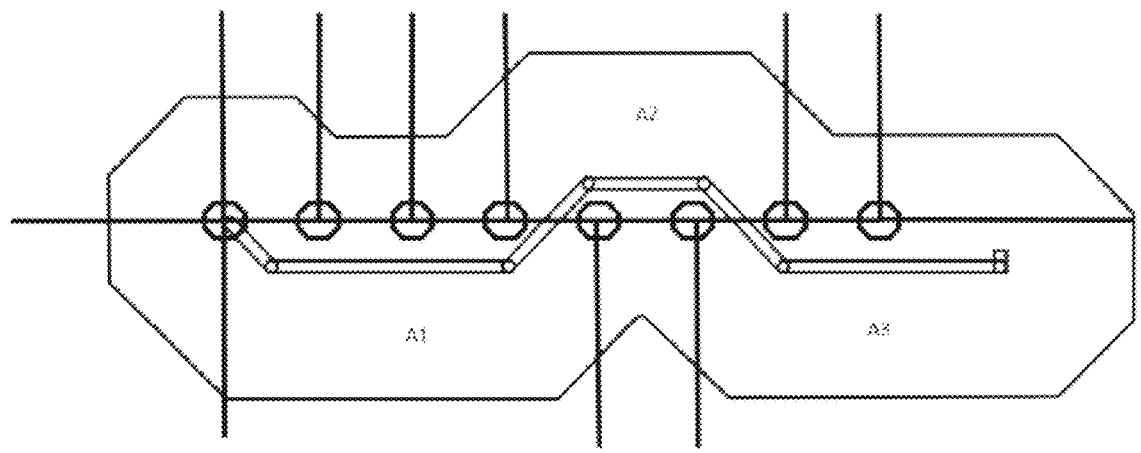
FIG. 20 is an example illustrating removal of blockages which overlap with the wires of Net N.

At this stage, the main net direction is determined. The main net direction is determined as the distance between the net pad and bump located farthest away from the net pad (see FIG. 19). If the vertical distance is larger than horizontal distance, the main net direction is vertical. Otherwise, the main net direction is horizontal. In the illustrated embodiment, the net direction is parallel with the longest combined blockage (e.g., defined as extending from each bump). In the example, the main direction is horizontal. If the non-main direction blockages cross the original RDL net, these crossed blockages are removed, as shown in FIG. 20. As shown in the specific embodiment of FIG. 20, the main direction of the RDL net is horizontal, and those vertical blockages that cross the wires of the RDL net are removed.

Continuing to Block 604 of FIG. 6, various embodiments then locate the areas (bounded by the bumps, blockages, and portions of the outer boundary) containing the original RDL net. After completion of the processes represented at Block 602, the area within the outer boundary is partitioned into several areas based on the location of blockages and the outside boundary (see FIGS. 20-21). Areas containing portions of the RDL net are determined as being between blockages and the outside boundary. To determine whether an area contains a portion of an RDL net, various embodiments determine whether an area bounded by blockages and/or the outside boundary contain at least a portion of the RDL net. Areas found to contain a portion of the RDL net are then identified and flagged for later analysis. In the illustrated example, areas A1, A2, and A3 contain the original RDL net (see FIG. 21).

Figure 21:
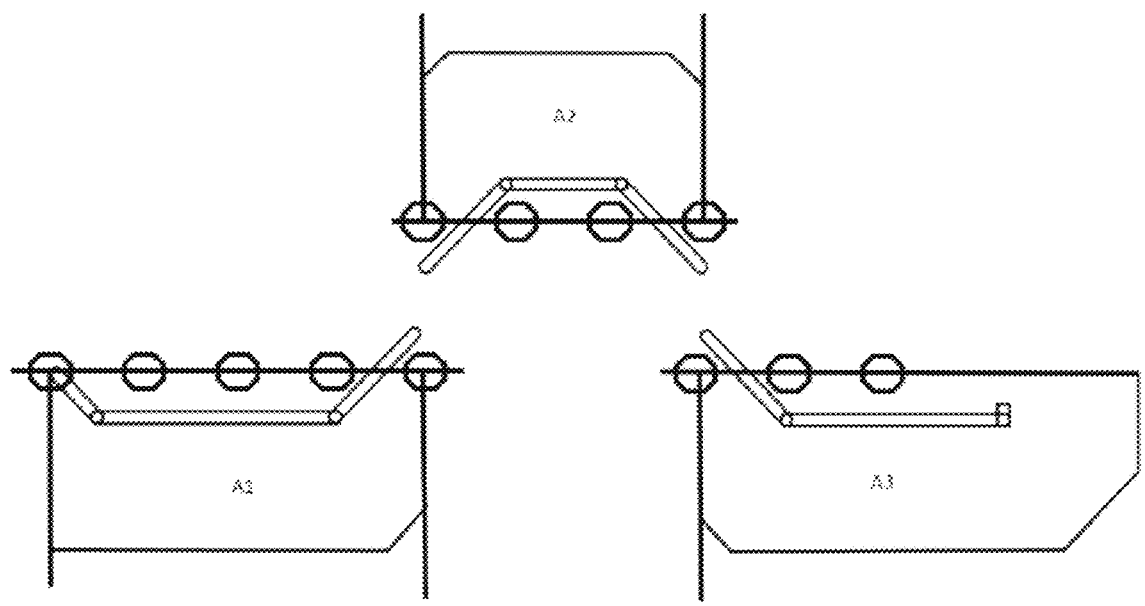
FIG. 21 is an example of areas partitioned by blockages and outside boundary. These areas contain wires of Net N.
Figure 22:
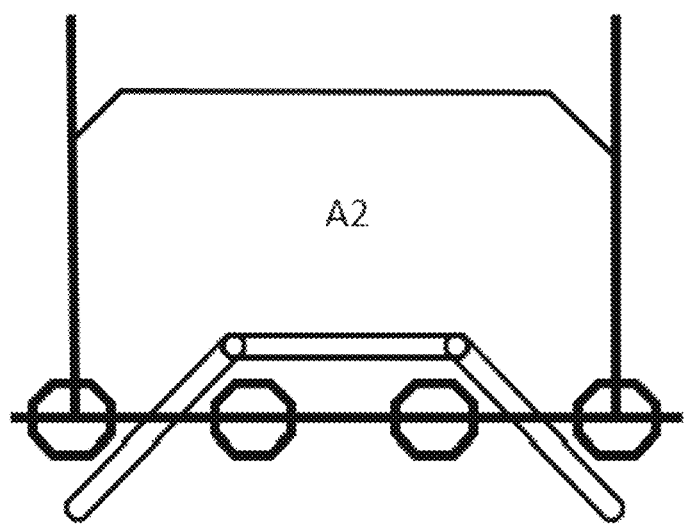
FIG. 22 is an example of a partitioned area in FIG. 21.
Figure 23:
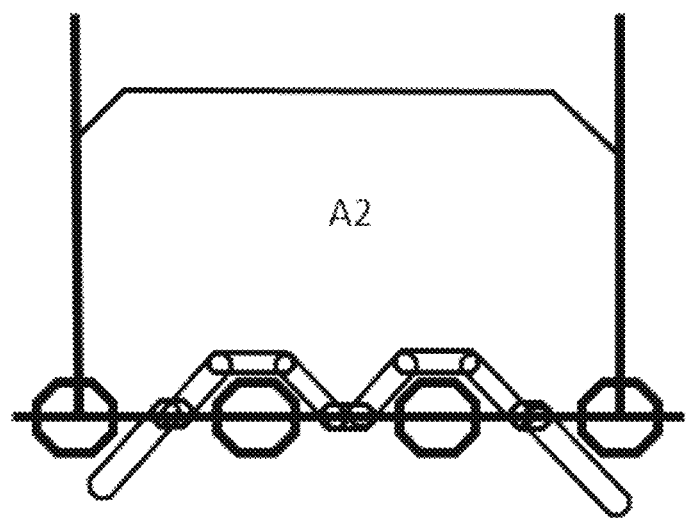
FIG. 23 is an example of pushing the wires along the down boundary.
Figure 24:
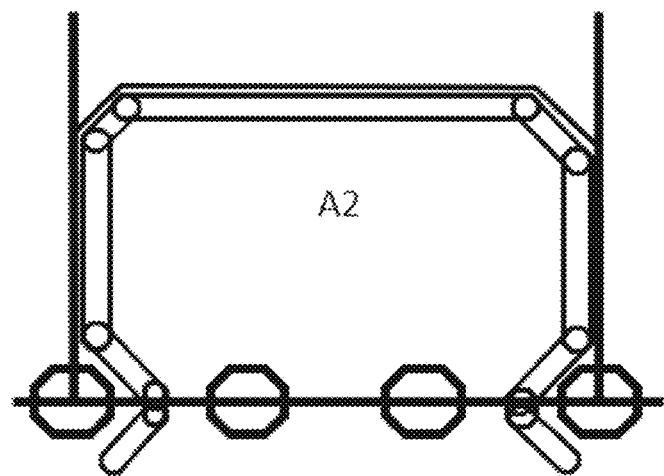
FIG. 24 is an example of pushing the wires along the upper boundary.

With reference now to Block 606 of FIG. 6, the method next analyses the optimizing direction. In certain embodiments, there may be a plurality of available optimizing directions for each area, and accordingly the most-optimal selection should be chosen for each area containing a portion of the RDL net. For example, there may be two available optimization directions by which the RDL net is pushed against a boundary of the area (such that the wires of the RDL net follow the contours of the boundary of the specific area, which is defined between the outer boundary of the net, the blockages, and the bumps and/or pads. With specific reference to the area A2 (shown in FIG. 22) of the partitioned area shown in FIG. 21, FIG. 23 is an example of pushing the wires along the first, lower boundary, defined by the bumps and the blockage extending between the bumps. FIG. 24 is an example of an alternative available optimization method, by which the wires are pressed against an outer boundary defined by the blockages extending between bumps and the outer boundary, and the outer boundary itself. Between these available optimization pathways, the appropriate optimization pathway is selected based at least in part according to the position of the original wire, the main direction of the RDL net, and the bump. If the main direction of the RDL net is horizontal, for example, and the position bump is below the original wire in the area, the optimizing direction to be utilized for the RDL net portion is to pull the wires downward, against the bumps and blockage. Otherwise for horizontal RDL nets, the optimizing direction is up (i.e., to pull the wires upward against the bumps and blockage). Each area containing a portion of the RDL area is optimized to determine the most appropriate optimizing direction. In the example, the most-appropriate direction of optimization of areas A1 and A3 is up and the most-appropriate direction of optimization of area A2 is down.

Figure 25:
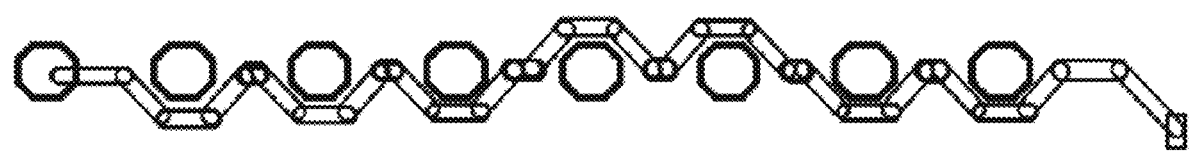
FIG. 25 is an example of result of pushing Net N.

With reference to Block 608 of FIG. 6, the overall RDL net is optimized for each area to push the wire against the boundary (specifically, the boundary defined by the edges of the bumps and the blockage, as shown in FIG. 23). After the optimization process is completed for each area, the resulting optimized RDL net is shown in the example of FIG. 25. The original RDL net is optimized. If there is no net capable of optimization, the design is optimized.

Technology Support General Computer Explanation

Figure 27A:
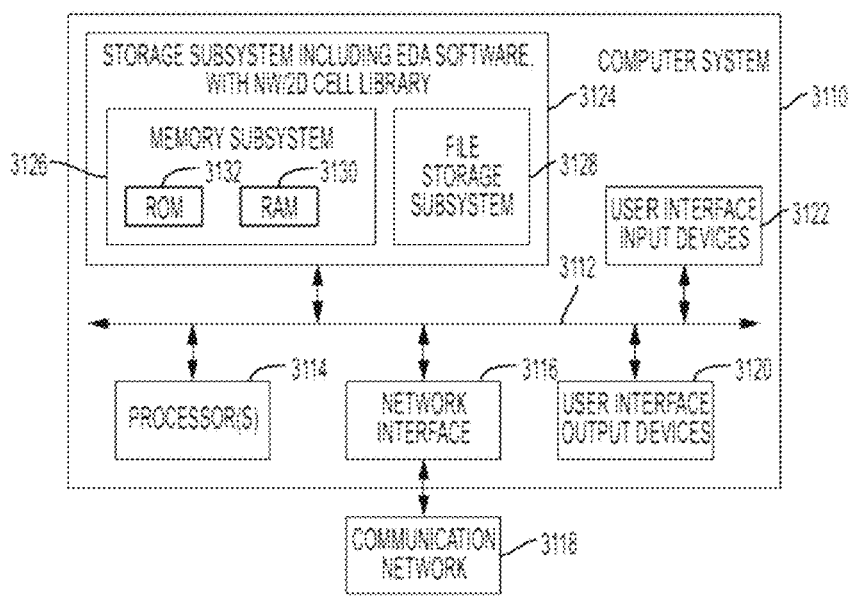
FIGS. 27A, 27B and 27C are simplified block diagrams of a computer system suitable for use with embodiments of the technology, as well as circuit design and circuit embodiments of the technology. In such various figures, reference signs may be omitted as is consistent with accepted engineering practice; however, one of ordinary skill in the art will understand that the illustrated components are readily understood when viewed in context of the illustration as a whole and the accompanying disclosure describing such various figures.
Figure 27B:
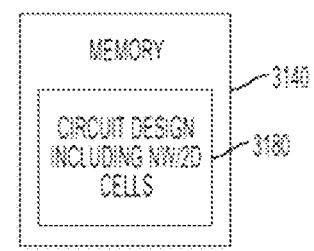
Figure 27C:
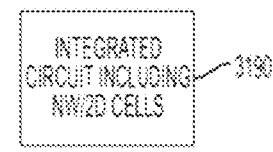

FIGS. 27A, 27B and 27C are simplified block diagrams of a computer system suitable for use with embodiments of the technology, as well as circuit design and circuit embodiments of the technology.

Computer system 3110 typically includes at least one computer or processor 3114 which communicates with a number of peripheral devices via bus subsystem 3112. Typically, the computer can include, or the processor can be, any of a microprocessor, graphics processing unit, or digital signal processor, and their electronic processing equivalents, such as an Application Specific Integrated Circuit (ASIC) or Field Programmable Gate Array (FPGA). The terms 'processor' and 'computer' are further defined below. These peripheral devices may include a storage subsystem 3124, comprising a memory subsystem 3126 and a file storage subsystem 3128, user interface input devices 3122, user interface output devices 3120, and a network interface subsystem 3116. The input and output devices allow user interaction with computer system 3110.

The computer system may be a server computer, a client computer, a workstation, a mainframe, a personal computer (PC), a tablet PC, a set-top box (STB), a personal digital assistant (PDA), a cellular telephone, a smartphone, a web appliance, a kiosk, a television, a game station, a network router, switch or bridge, or any data processing machine capable of executing instructions 124 (sequential or otherwise) that specify actions to be taken by that machine. The computer system typically includes an operating system, such as Microsoft's Windows, Apple Computer's Mac OS, Linux or Unix.

Innovations, embodiments and/or examples of the claimed inventions are neither limited to conventional computer applications nor the programmable apparatus that run them. For example, the innovations, embodiments and/or examples of the claimed inventions can include an optical computer, quantum computer, analog computer, or the like. The computer system may be a multi-processor or multi-core system and may use or be implemented in a distributed or remote system. The term 'processor' here is used in the broadest sense to include a singular processor and multi-core or multiprocessor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions 124 to perform any one or more of the sets of instructions discussed herein. Due to the ever-changing nature of computers and networks, the description of computer system 3110 depicted in FIG. 27A is intended only as one example for purposes of illustrating the preferred embodiments. Many other configurations of computer system 3110 are possible having more or less components than the computer system depicted in FIG. 27A.

Network interface subsystem 3116 provides an interface to outside networks, including an interface to communication network 3118, and is coupled via communication network 3118 to corresponding interface devices in other computer systems or machines. Communication network 3118 may comprise many interconnected computer systems, machines and communication links. These communication links may be wireline links, optical links, wireless links, or any other devices for communication of information. Communication network 3118 can be any suitable computer network, for example a wide area network such as the Internet, and/or a local area network such as Ethernet. The communication network can be wired and/or wireless, and the communication network can use encryption and decryption methods, such as is available with a virtual private network.

User interface input devices 3122 may include an alpha-numeric keyboard, pointing devices such as a mouse, trackball, touchpad, stylus, or graphics tablet, a scanner, a touch-screen incorporated into the display, audio input devices such as voice recognition systems, microphones, and other types of input devices. In general, use of the term "input device" is intended to include all possible types of devices and ways to input information into computer system 3110 or onto communication network 3118.

User interface output devices 3120 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from computer system 3110 to the user or to another machine or computer system.

Memory subsystem 3126 typically includes a number of memories including a main random-access memory (RAM) 3130 (or other volatile storage device) for storage of instructions and data during program execution and a read only memory (ROM) 3132 in which fixed instructions are stored. File storage subsystem 3128 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 3128.

Bus subsystem 3112 provides a device for letting the various components and subsystems of computer system 3110 communicate with each other as intended. Although bus subsystem 3112 is shown schematically as a single bus, alternative embodiments of the bus subsystem may use multiple busses. For example, RAM-based main memory can communicate directly with file storage systems using Direct Memory Access (DMA) systems.

FIG. 27B shows a memory 3140 such as a non-transitory, computer readable data and information storage medium associated with file storage subsystem 3128, and/or with network interface subsystem 3116, and can include a data structure specifying a circuit design. The memory 3140 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 27C is a block representing an integrated circuit 3190 created with the described technology that includes one or more cells selected, for example, from a cell library.

Technology Support Hardware/Software Equivalence

Some of the innovations, embodiments and/or examples described herein comprise and/or use a processor. As used herein, the term 'processor' signifies a tangible data and information processing device that physically transforms data and information, typically using a sequence transformations (also referred to as 'operations'). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For data and information structured in binary form, any processor that can transform the data and information using the AND, OR and NOT logical operations (and their derivatives, such as the NAND, NOR, and XOR operations) can transform the data and information using any function of Boolean logic. A processor such as an analog neural network processor can also transform data and information non-digitally. There is no scientific evidence that any of these processors are processing, storing and retrieving data and information, in any manner or form equivalent to the bioelectric structure of the human brain.

The one or more processors may also operate to support performance of the relevant operations in a 'cloud computing' environment or as a 'software as a service' (SaaS). For example, at least some of the operations may be performed by a group of processors available at a distributed or remote system, these processors accessible via a communications network (e.g., the Internet) and via one or more software interfaces (e.g., an application program interface (API).

As used herein, the term 'module' signifies a tangible data and information processing device, that typically is limited in size and/or complexity. For example, the term 'module' can signify one or more methods or procedures that can transform data and information. The term 'module' can also signify a combination of one or more methods and procedures in a computer program. The term 'module' can also signify a small network of digital logic devices, in which interconnections of the logic devices give structure to the network. Methods and procedures comprising a module, specified in a specialized language, such as System C, can be used to generate a specification for a network of digital logic devices that process data and information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Intel's Altera), Random Access Memories (RAMs) or microprocessors. A module is configured to process data and information, typically using a sequence transformations (also referred to as 'operations') applied to the data and information (or in the case of ROMs and RAMS, transforming data and information by using the input information as an address for memory that stores output data and information), to perform aspects of the present innovations, embodiments and/or examples of the invention.

Modules that are temporarily configured need not be configured at any one instance in time. For example, a processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term 'algorithm' signifies a sequence or set of operations or instructions that a module can use to transform data and information to achieve a result. A module can comprise one or more algorithms.

As used herein, the term 'computer' includes at least one information processor that, for example, can perform certain operations such as (but not limited to) the AND, OR and NOT logical operations using electronic gates that can comprise transistors, with the addition of memory (for example, memory based on flip-flops using the NOT-AND or NOT-OR operation). Such a processor is said to be Turing-complete or computationally universal. A computer, whether or not it is a digital computer, typically comprises many modules.

As used herein, the term 'software' or 'program' signifies one or more algorithms and data structures that configure a processor for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of data and instructions that configure the processor to achieve a specific result, for example, to perform word processing operations, or to encrypt a set of data.

As used herein, the term 'programming language' signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C-i--i- or the like, and any future equivalent programming languages.

Software is entered into, equivalently, read into, one or memories of the computer or computer system from a data and information storage device. The computer typically has a device for reading storage media that is used to transport the software, or has an interface device that receives the software over a network. This process is discussed in the General Computer Explanation section.

Technology Support EDA System/Workflow Explanation

Figure 26:
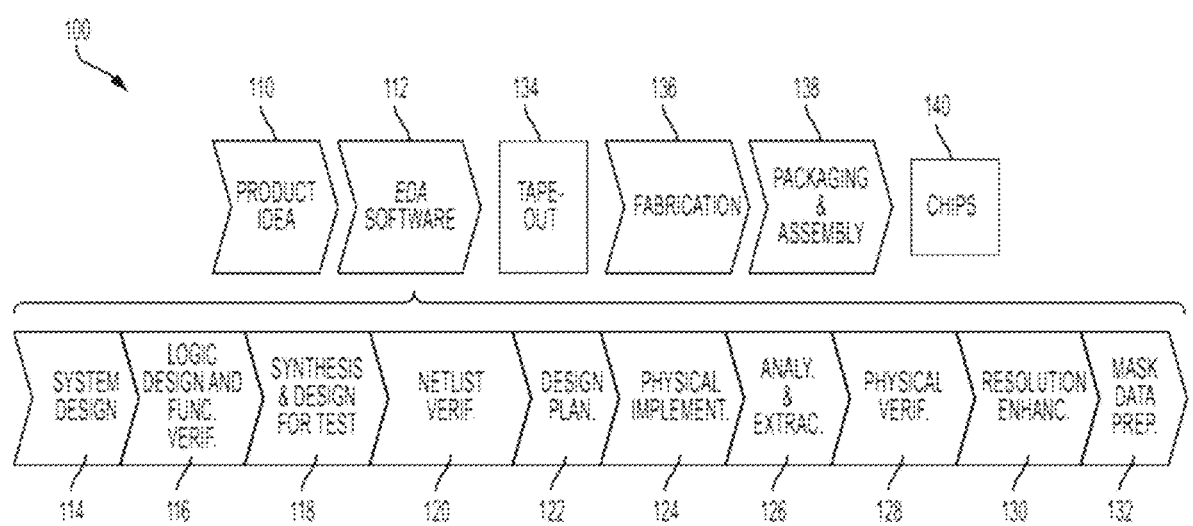
FIG. 26 is a flowchart illustrating various operations in the design and fabrication of an integrated circuit in accordance with an embodiment of the present disclosure.

FIG. 26 illustrates various processes performed in the design, verification and fabrication of an item of manufacture such as an integrated circuit using software tools with a computer, and possibly special hardware-assisted tools, to transform and verify design data and instructions that represent the integrated circuit. These processes start with the generation of a product idea (110) with information supplied by a designer, information which is transformed during a process to create an item of manufacture (referred to herein as a design or device) that uses EDA software tools (112), which may also be signified herein as EDA software, as a design tool or a verification tool. When the design is finalized, it can be taped-out (134), which typically is when artwork for the integrated circuit is sent to a fabrication facility. After tape-out, a semiconductor die is fabricated (136) and packaging and assembly processes (138) are performed, which result in the finished integrated circuit (140) which may also be signified herein as a circuit, device, component, chip or SoC (System on Chip).

Items of manufacture, for example, a circuit or system are used in commerce at a variety of levels of abstraction ranging from low-level transistor layouts to high-level description languages. Most designers start at high-level of abstraction to design their circuits and systems, using a hardware description language (HDL) such as VHDL, Verilog, SystemVerilog, SystemC, MyHDL or OpenVera. The high-level HDL is easier for developers to comprehend, especially for a vast system, and may describe highly complex concepts that are difficult to grasp using a lower level of abstraction. The HDL description may be converted into other levels of abstraction as is helpful to the developers. For example, a high-level description may be converted to a logic-level register transfer level (RTL) description, a gate-level (GL) description, a layout-level description, or a mask-level description. Each lower abstraction level introduces more detail into the design description. The lower-levels of abstraction may be generated automatically by computer, derived from a design library, or created by another design automation technique. An example of a specification language at a lower level of abstraction is SPICE, much used detailed descriptions of analog-based circuits.

A design process that uses EDA software tools (112) includes tasks 114-132, which are described below. This design flow description is for illustration purposes only and is not meant to limit the present disclosure. For example, an actual integrated circuit design may require a designer to perform the design operations in a different sequence than the sequence described herein.

During system design (114), a designer describes the functionality to be manufactured. The designer can also perform what-if planning to refine the functionality and to check costs. Note that hardware-software architecture partitioning can occur at this stage. Exemplary EDA software products from Synopsys, Inc. of Mountain View, Calif. that can be used at this stage include: Model Architect, Saber, System Studio, and Designware products.

During logic design and functional verification (116), modules in the circuit are specified in one or more hardware description languages, or HDLs, and the design in HDL is checked for functional accuracy. More specifically, the design is checked to ensure that it produces the correct outputs. Exemplary HDL languages are Verilog, VHDL and SystemC. Functional verification is typically done by using software-based simulators and other tools such as testbench generators, static HDL checking tools and formal verification tools. In some situations, special hardware referred to as 'emulators' or 'Prototyping systems' are used to speed up the functional verification. Exemplary EDA software products from Synopsys, Inc. of Mountain View, Calif. that can be used at this stage include: VCS, Vera, Designware, Magellan, Formality, ESP and Leda products. Exemplary emulator and prototyping products also available from Synopsys that can be used at this state include: Zebu.RTM. and Protolink-.RTM.

During synthesis and design for test (118), VHDL/Verilog code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

During netlist verification (120), the netlist is checked for compliance with timing constraints and for correspondence with the VHDL/Verilog code. Exemplary EDA software products from Synopsys, Inc. of Mountain View, Calif. that can be used at this stage include: Formality, Primetime, and VCS products.

During design planning (122), an overall floor plan for the integrated circuit is constructed and analyzed for timing and top-level routing. Exemplary EDA software products from Synopsys, Inc. of Mountain View, Calif. that can be used at this stage include: Astro and IC Compiler products.

During layout implementation (124), the placement (positioning of circuit elements such as transistors or capacitors) and routing (connection of the same by a plurality of conductors) occurs. Exemplary EDA software products from Synopsys, Inc. of Mountain View, Calif. that can be used at this stage include: the Astro and IC Compiler products.

During analysis and extraction (126), the circuit function is verified at the layout level, which permits refinement of the layout design. Exemplary EDA software products from Synopsys, Inc. of Mountain View, Calif. that can be used at this stage include: Astrorail, Primerail, Primetime, and Star RC/XT products.

During physical verification (128), the layout design is checked to ensure correctness for manufacturing constraints such as DRC constraints, electrical constraints, lithographic constraints, and circuitry function matching the HDL design specification. Exemplary EDA software products from Synopsys, Inc. of Mountain View, Calif. that can be used at this stage include the Hercules product.

During resolution enhancement (130), geometric manipulations of the layout are performed to improve manufacturability of the design. Exemplary EDA software products from Synopsys, Inc. of Mountain View, Calif. that can be used at this stage include: Proteus products.

During mask-data preparation (132), the 'tape-out' data for production of masks to produce finished integrated circuits is provided. Exemplary EDA software products from Synopsys, Inc. of Mountain View, Calif. that can be used at this stage include the CATS family of products.

For all of the above mentioned integrated circuit design tools, similar tools from other EDA vendors, such as Cadence, Siemens, other corporate entities or various non-commercial tools from universities, or open source repositories, can be used as an alternative.

Embodiments of the present disclosure can be used during one or more of the above-described stages. Specifically, some embodiments of the present disclosure can be used in EDA software (112).

A storage subsystem is preferably used to store the programs and data structures that provide the functionality of some or all of the EDA tools described herein, and tools applied for development of cells for the library and for physical and logical design using the library. These programs and data structures are generally executed by one or more processors in a manner known to those of ordinary skill in the art.

Semantic Support

The signifier 'commercial solution' signifies, solely for the following paragraph, an engineering domain-specific (and thus non-preemptive—see Bilski) electronic structure, process for specified machines, manufacturable circuit (and their Church-Turing equivalents) or composition of matter that is useful in commerce to solve a problem of technology, that is, a use in commerce of an application of science or use in commerce of technology.

The signifier 'abstract' (when used in a patent claim for any embodiments disclosed herein for a new commercial solution that is a scientific application of one or more laws of nature {see Benson}, and that solves a problem of technology {see Diehr} used in commerce—or improves upon an existing commercial solution {see Diehr})—is precisely defined by the inventor(s) {see MPEP 2111.01; $9^{th}$ Edition, Revision Jan. 2018} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is "difficult to understand" {see Merriam-Webster definition for 'abstract'} how the commercial solution differs from equivalent prior art solutions; or b) a new commercial solution is 'abstract' if it is obvious, that is, if the existing prior art includes at least one analogous prior art solution {see KSR}, or the existing prior art includes at least two prior art items that can be combined {see Alice} by a person having ordinary skill in the art {a "PHOSITA", see MPEP 2141-2144} to be equivalent to the new commercial solution, and is thus unpatentable under 35 U.S.C. 103, for example, because it is "difficult to understand" how the new commercial solution differs from a PHOSITA-combination/-application of the existing prior art; or c) a new commercial solution is 'abstract' if it is not disclosed with an enabling description either because there is insufficient guidance in the enabling description, or because only a generic implementation is described {see Mayo} with unspecified elements, parameters or functionality, so that a PHOSITA is unable to instantiate a useful embodiment of the new commercial solution, without, for example, requiring special programming {see Katz} or circuit design to be performed by the PHOSITA), and is thus unpatentable under 35 U.S.C. 112, for example, because it is "difficult to understand" how to use in commerce any embodiment of the new commercial solution.

Conclusion

The foregoing Detailed Description signifies in isolation the individual features, structures, functions, or characteristics described herein and any combination of two or more such features, structures, functions or characteristics, to the extent that such features, structures, functions or characteristics or combinations thereof are based on the present specification as a whole in light of the knowledge of a person skilled in the art, irrespective of whether such features, structures, functions or characteristics, or combinations thereof, solve any problems disclosed herein, and without limitation to the scope of the claims. When an embodiment of a claimed invention comprises a particular feature, structure, function or characteristic, it is within the knowledge of a person skilled in the art to use such feature, structure, function, or characteristic in connection with other embodiments whether or not explicitly described, for example, as a substitute for another feature, structure, function or characteristic.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein were chosen and described to signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

That which is claimed:

1. A computer-implemented method for routing a circuit net within a flip-chip circuit device having an array of bumps, the computer-implemented method comprising:

identifying, via one or more processors, an initial circuit net route for a circuit net in electrical connection with a first bump within the array of bumps included in the flip-chip circuit device;

defining, via the one or more processors, an outer boundary surrounding the initial circuit net route, wherein a perimeter of the outer boundary is defined based at least in part on a location of a plurality of wire segments within the initial circuit net route and is positioned at a defined distance away from the initial circuit net route;

defining one or more blockages extending from each bump of the array of bumps to intersect the outer boundary, wherein each of the one or more blockages and a plurality of second bumps of the array of bumps collectively define an edge of a region available for rerouting the initial circuit net route;

subdividing the initial circuit net route into a plurality of circuit net portions, wherein each circuit net portion is bounded by a portion of the outer boundary and one or more of the blockages;

rerouting at least one of the plurality of circuit net portions to be adjacent at least one blockage of the one or more blockages bounding the circuit net portion to generate a rerouted circuit net route; and generating, via the one or more processors and within a memory storage area, layout data for the flip-chip circuit device comprising the rerouted circuit net route.

2. The computer-implemented method of claim 1, wherein the circuit net is defined as a Redistribution Layer (RDL) net.

3. The computer-implemented method of claim 2, wherein the RDL net comprises a plurality of wires.

4. The computer-implemented method of claim 3, wherein defining an outer boundary comprises defining an outer boundary surrounding each of the plurality of wires.

5. The computer-implemented method of claim 1, wherein defining one or more blockages comprises:
defining four blockages extending from each bump; and
removing blockages detected to intersect the initial circuit net route.

6. The computer-implemented method of claim 1, wherein rerouting the at least one of the plurality of circuit net portions comprises routing the at least one of the plurality of circuit net portions around at least a portion of each of one or more bumps.

7. A non-transitory computer readable medium comprising instructions which when executed by a computer cause the computer to:
identify an initial circuit net route for a circuit net in electrical connection with a first bump within the array of bumps included in the flip-chip circuit device;
define an outer boundary surrounding the initial circuit net route, wherein a perimeter of the outer boundary is defined based at least in part on a location of a plurality of wire segments within the initial circuit net route and is positioned at a defined distance away from the initial circuit net route;
define one or more blockages extending from each bump of the array of bumps to intersect the outer boundary, wherein each of the one or more blockages and a plurality of second bumps of the array of bumps collectively define an edge of a region available for rerouting the initial circuit net route;
subdivide the initial circuit net route into a plurality of circuit net portions, wherein each circuit net portion is bounded by a portion of the outer boundary and one or more of the blockages;
reroute at least one of the plurality of circuit net portions to be adjacent at least one blockage of the one or more blockages bounding the circuit net portion to generate a rerouted circuit net route; and
generate, within a memory storage area, layout data for the flip-chip circuit device comprising the rerouted circuit net route.

8. The non-transitory computer readable medium of claim 7, wherein the circuit net is defined as a Redistribution Layer (RDL) net.

9. The non-transitory computer readable medium of claim 8, wherein the RDL net comprises a plurality of wires.

10. The non-transitory computer readable medium of claim 9, wherein defining an outer boundary comprises defining an outer boundary surrounding each of the plurality of wires.

11. The non-transitory computer readable medium of claim 7, wherein defining one or more blockages comprises:
defining four blockages extending from each bump; and
removing blockages detected to intersect the initial circuit net route.

12. The non-transitory computer readable medium of claim 7, wherein rerouting the at least one of the plurality of circuit net portions comprises routing the at least one of the plurality of circuit net portions around at least a portion of each of one or more bumps.

13. A system for routing a circuit net within a flip-chip circuit device having an array of bumps, the system comprising:
at least one processing unit configured to:
identify an initial circuit net route for a circuit net in electrical connection with a first bump within the array of bumps included in the flip-chip circuit device;
define an outer boundary surrounding the initial circuit net route, wherein a perimeter of the outer boundary is defined based at least in part on a location of a plurality of wire segments within the initial circuit net route and is positioned at a defined distance away from the initial circuit net route;
define one or more blockages extending from each bump of the array of bumps to intersect the outer boundary, wherein each of the one or more blockages and a plurality of second bumps of the array of bumps collectively define an edge of a region available for rerouting the initial circuit net route;
subdivide the initial circuit net route into a plurality of circuit net portions, wherein each circuit net portion is bounded by a portion of the outer boundary and one or more of the blockages;
reroute at least one of the plurality of circuit net portions to be adjacent at least one blockage of the one or more blockages bounding the circuit net portion to generate a rerouted circuit net route; and
generate, within a memory storage area, layout data for the flip-chip circuit device comprising the rerouted circuit net route.

14. The system of claim 13, wherein the circuit net is defined as a Redistribution Layer (RDL) net.

15. The system of claim 14, wherein the RDL net comprises a plurality of wires.

16. The system of claim 15, wherein defining an outer boundary comprises defining an outer boundary surrounding each of the plurality of wires.

17. The system of claim 13, wherein defining one or more blockages comprises:
defining four blockages extending from each bump; and
removing blockages detected to intersect the initial circuit net route.

18. The system of claim 13, wherein rerouting the at least one of the plurality of circuit net portions comprises routing the at least one of the plurality of circuit net portions around at least a portion of each of one or more bumps.

* * * * *